(No Model.) 3 Sheets—Sheet 1.
J. F. GOODRICH.
VEHICLE SEAT.
No. 397,590. Patented Feb. 12, 1889.

Witnesses:
Chas. B. Shumway
Harry Hall.

Inventor
Joseph F. Goodrich
By Geo. D. Seymour
Atty.

(No Model.) 3 Sheets—Sheet 2.

J. F. GOODRICH.
VEHICLE SEAT.

No. 397,590. Patented Feb. 12, 1889.

Witnesses:
Chas. B. Shumway
Harry Hall

Inventor
Joseph F. Goodrich
By George D. Seymour
Atty.

(No Model.) 3 Sheets—Sheet 3.

J. F. GOODRICH.
VEHICLE SEAT.

No. 397,590. Patented Feb. 12, 1889.

Witnesses:
Chas. B. Shumway
Harry Hall.

Inventor.
Joseph F. Goodrich
By George Seymour
Atty.

UNITED STATES PATENT OFFICE.

JOSEPH F. GOODRICH, OF NEW HAVEN, CONNECTICUT.

VEHICLE-SEAT.

SPECIFICATION forming part of Letters Patent No. 397,590, dated February 12, 1889.

Application filed November 16, 1888. Serial No. 290,985. (No model.)

*To all whom it may concern:*

Be it known that I, JOSEPH F. GOODRICH, residing at New Haven, in the county of New Haven and State of Connecticut, have invented certain new and useful Improvements in Vehicle-Seats; and I do declare the following to be a full, clear, and exact description of the same, reference being had to the accompanying drawings, which form a part of this specification.

My invention relates to an improvement in seats for jump-seat carriages, the object being to provide for the conversion of a two-seated jump-seat carriage into a dos-a-dos, in which the occupants of the vehicle are seated back to back.

With these ends in view my invention consists in a jump-seat having a movable back in combination with means for supporting such back in a horizontal position, and in certain details of construction, as will be hereinafter more fully described, and pointed out in the claims.

Figure 1:
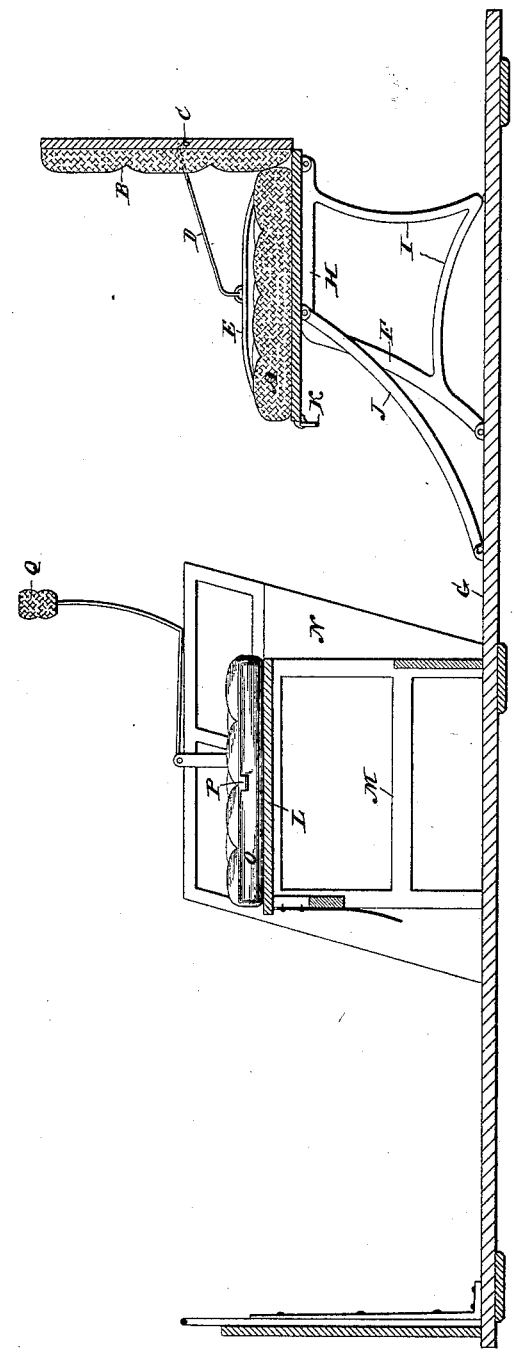
Figure 2:
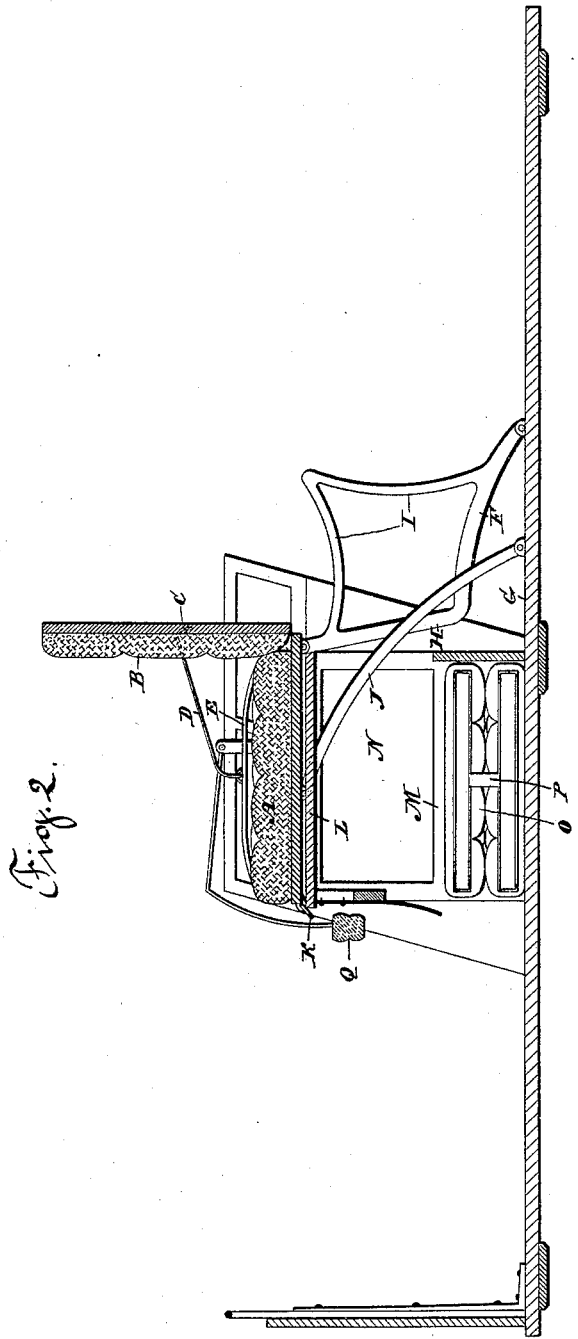
Figure 3:
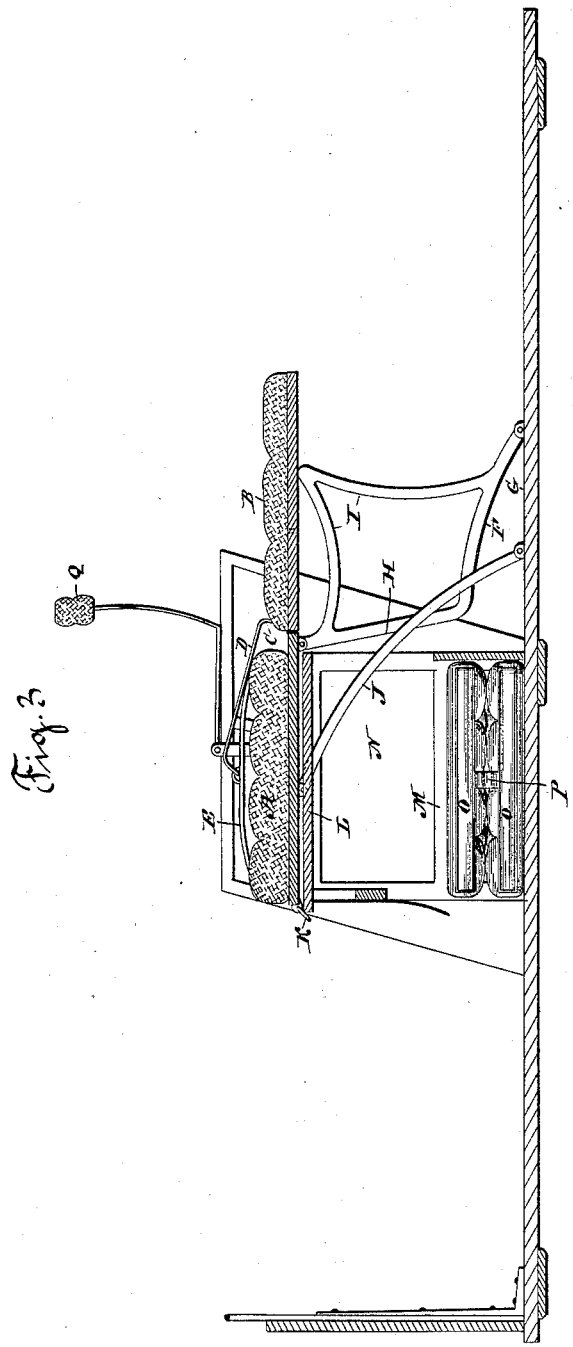

In the accompanying drawings, Figure 1 is a view in vertical longitudinal section of my improved carriage, with the jump-seat arranged to take the place of the back seat of an ordinary two-seated carriage. Fig. 2 is a similar view with the jump-seat jumped forward to form a one-seated carriage; and Fig. 3 is a similar view with the jump-seat jumped forward and its hinged back turned down to form the back seat of a "dos-a-dos," as carriages in which two seats are located back to back are called.

As herein shown, my improved jump-seat A has an upholstered hinged back, B, provided at each end with a hook, C, for engagement by pivotal braces D, secured to the guards E E, located at the ends of the seat. Two light skeleton iron frames, F, respectively located at the opposite ends of the seat, are pivoted to the rear edge thereof and to the body G of the carriage, which in this case is a buckboard, at a point in about the same vertical line as the forward edge of the seat. These frames are shaped to form horizontal bearings H for the seat to rest upon when in its ordinary position, and are each provided with an arm, I, having the twofold function of supporting the seat when the same is in such position and of supporting its back when the seat is jumped forward and its back turned down to transform the carriage into a dos-a-dos. Two long levers, J J, pivoted to the seat and to the carriage-body, assist in binding the seat to the body and relieve the strain upon the frames aforesaid. A handle, K, pivoted below the forward edge of the seat, is provided for convenience in jumping it forward and back.

The front seat, L, of the carriage is, as herein shown, supported upon a rigid frame, M, and inclosed at its ends by casings N. Its cushion O is made in two like parts, united by a strap, P, whereby it is adapted to be readily folded and placed under the seat when the carriage is converted into a one-seated carriage or into a dos-a-dos. The front seat is also provided with a lazy-back, Q, pivoted at its ends, and so adapted to be swung over in front of the seat and out of the way when the jump-seat is jumped over upon the front seat of the vehicle.

Having described one form of my invention in detail, I will now explain how it is used.

To convert the vehicle from an ordinary two-seated vehicle into a one-seated carriage, the cushion of the front seat is removed, folded up and placed under such seat, and the lazy-back folded over out of the way. The handle pivoted to the back seat is then grasped, and such seat pulled or jumped forward upon the front seat, which then supports it, the pivotal frames and the staying-levers being turned over, but having then no function except that of holding the seat from displacement upon the supporting front seat.

This form of the carriage is shown by Fig. 2 of the drawings. To convert the carriage into a dos-a-dos, the adjustments above described are made, and the braces of the hinged back of the jump-seat are uncoupled and such back turned down to rest upon the now uplifted arms of the pivotal frames. This forms the dos-a-dos, as shown by Fig. 3 of the drawings. By means of these conversions of the seats three different vehicles are virtually combined in one. Moreover, the conversions are very easily made, the jump-seat being light and easily shifted forward and back.

My improved hinged back jump-seat is not limited, of course, to use with buckboard-carriages, but may be applied to carriages constructed on quite different principles as to their bodies. The means for supporting the hinged back of the jump-seat in its upright and in its horizontal positions may also be modified. If desired, the pivotal frames may be made of wood. If desired, also, provision may be made for supporting the back of the jump-seat in a horizontal position in the ordinary or normal position of the jump-seat, thus forming a three-seated carriage. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A jump-seat for vehicles, having an independently-movable back and means for supporting such back in a horizontal position independent of the adjustments of other parts of the vehicle, substantially as set forth.

2. A jump-seat for vehicles, having an independently-movable back and means for supporting such back in a horizontal position and disconnected from it to permit it to be used as a seat or as a back independent of the adjustments of the other parts of the vehicle, substantially as set forth.

3. The combination, in a vehicle, with a seat, of a jump-seat adapted to be used by itself and to be jumped over and upon the other seat and having a movable or hinged back, and means for supporting such back in a horizontal position to form a seat, substantially as set forth.

4. A jump-seat for vehicles, having a hinged back and a frame pivoted to the seat and to the vehicle-body and supporting the seat in its ordinary position and the seat-back when the seat is jumped forward and the back turned down to form a seat, substantially as set forth.

5. A jump-seat for vehicles, having a hinged back and pivotal frames pivoted to the seat and to the vehicle-body, and having seat-bearings upon which the seat rests when in its normal position, and arms which support the seat in such position and the seat-back when the seat is jumped forward and the back turned down to form a seat, substantially as set forth.

6. A jump-seat for vehicles, having a hinged back and two light skeleton metal frames pivoted to such seat and to the vehicle-body and adapted to support the seat when in its ordinary position and its back when the same is turned down to form a seat, substantially as set forth.

In testimony whereof I have signed this specification in the presence of two subscribing witnesses.

JOSEPH F. GOODRICH.

Witnesses:
CHAS. B. SHUMWAY,
WM. J. DE MAURIAC.